(12) United States Patent
Sill (10) Patent No.: US 8,438,721 B1
(45) Date of Patent: May 14, 2013

(54) METHOD TO ASSEMBLE DISK DRIVE

(75) Inventor: Kevin Richard Sill, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 265 days.

(21) Appl. No.: 12/797,517

(22) Filed: Jun. 9, 2010

(51) Int. Cl.
*G11B 5/127* (2006.01)
*H04R 31/00* (2006.01)

(52) U.S. Cl.
USPC .............. 29/603.03; 29/603.04; 29/603.07; 29/603.09; 360/98.01

(58) Field of Classification Search .. 29/603.03–603.07, 29/603.09; 360/97.02, 97.03, 98.01
See application file for complete search history.

(56) References Cited

U.S. PATENT DOCUMENTS

| | | | |
|---|---|---|---|
| 4,329,722 A | 5/1982 | West | |
| 5,030,260 A * | 7/1991 | Beck et al. | 96/139 |
| 5,307,222 A | 4/1994 | Dion | |
| 5,406,431 A | 4/1995 | Beecroft | |
| 5,447,695 A | 9/1995 | Brown et al. | |
| 5,764,435 A | 6/1998 | Sugimoto et al. | |
| 5,877,915 A | 3/1999 | Ishida | |
| 6,296,691 B1 | 10/2001 | Gidumal | |
| 6,395,073 B1 | 5/2002 | Dauber | |
| 6,507,452 B1 * | 1/2003 | Bae et al. | 360/97.17 |
| 6,557,240 B1 | 5/2003 | Voights | |
| 6,618,222 B1 * | 9/2003 | Watkins et al. | 360/97.18 |
| 6,657,812 B2 * | 12/2003 | Serizawa et al. | 360/99.22 |
| 6,926,761 B2 | 8/2005 | Johnson et al. | |
| 7,064,920 B2 | 6/2006 | Fujiwara et al. | |
| 7,082,012 B2 | 7/2006 | Macpherson et al. | |
| 7,209,319 B1 | 4/2007 | Watkins et al. | |
| 7,274,534 B1 | 9/2007 | Choy et al. | |
| 7,291,208 B2 | 11/2007 | Dauber et al. | |
| 7,306,659 B2 | 12/2007 | Gorton et al. | |
| 7,382,572 B1 | 6/2008 | Turner et al. | |
| 7,486,474 B2 * | 2/2009 | Shin et al. | 360/97.18 |

OTHER PUBLICATIONS

United States Statutory Invention Registration No. H1067, Inventor: Steve S. Eckerd, Published Jun. 2, 1992, 7 pages.

\* cited by examiner

*Primary Examiner* — Paul D Kim

(57) ABSTRACT

A disk drive is assembled to have a cover that includes a hole therethrough, and an annular gasket continuously encircling the hole and being adhered to an undersurface of the disk drive cover. A breather filter is adjacent the disk drive base. The breather filter includes a breather filter housing having a top surface and an entrance port. The annular gasket is in compressive contact with, but not adhered to, the top surface of the breather filter housing. The annular gasket encircles the entrance port. In certain embodiments, this method of assembly may facilitate disk drive rework.

15 Claims, 7 Drawing Sheets

METHOD TO ASSEMBLE DISK DRIVE

BACKGROUND

During assembly of a typical hard disk drive, a breather filter is adhered to a component of the disk drive enclosure (i.e. the disk drive base or the disk drive cover) before being put into the disk drive. A leak test is then typically done to determine if the breather filter properly adhered to the disk drive base or the disk drive cover. This may be necessary because, the assembled disk drive may be leak tested afterwards in a way that depends upon an assumption that the interface between breather filter and the disk drive enclosure is leak free (which it might not be). Hence, there is a need in the art for a disk drive design and/or assembly method that enables practical and simultaneous leak testing of all potential leak paths from the disk drive enclosure, including the breather filter interface with the disk drive enclosure.

Also, during assembly of a typical hard disk drive, the disk drive cover may be positioned and attached to the disk drive base after the breather filter is adhered to the disk drive cover. During this assembly step, there is an increased risk of interference and damaging contact between the breather filter and more fragile components of the disk drive, such as a head suspension, etc. Enhancing the precision of the disk drive cover install process may help reduce this risk, but doing that may undesirably increase the cost and duration of the assembly step. Hence, there is a need in the art for a disk drive design and/or assembly method that may reduce the cost, duration, and/or risk of damage associated with top cover assembly.

After assembly, a significant percentage of assembled disk drives must be disassembled to repair or replace an internal component, followed by reassembly, in a process known as disk drive "rework." Disk drive rework typically requires removal and replacement of the disk drive top cover. Moreover, disk drive rework may also require removal and replacement of the breather filter, for example to permit removal of another component and/or if the breather filter itself or its installation is faulty. In conventional disk drives the adherence or attachment of the breather filter to the disk drive enclosure may complicate the disk drive rework process. Hence, there is a need in the art for a disk drive design and/or assembly method that may help simplify the disk drive rework process, for example by facilitating clean and practical removal and replacement of the disk drive top cover and/or the breather filter.

DETAILED DESCRIPTION OF EXAMPLE EMBODIMENTS

Figure 1:
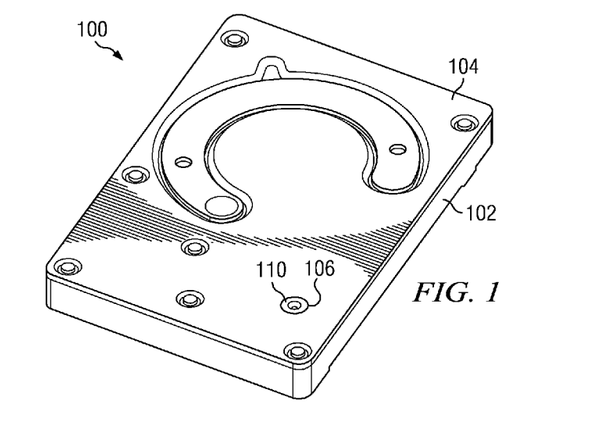
FIG. 1 is a top perspective view of a disk drive according to an embodiment of the present invention, with the disk drive top cover in place.

FIG. 1 is a top perspective view of a disk drive 100 according to an embodiment of the present invention, that has a disk drive enclosure formed by a disk drive base 102 and a disk drive cover 104. Being "formed by" the disk drive cover 102 and the disk drive base 104 does not imply that the disk drive enclosure is formed only by the disk drive cover 102 and the disk drive base 104. For example, the disk drive enclosure may also be completed by gasket, seal, fastener and filter components. The disk drive cover 104 is shown in FIG. 1 to be in place and attached to the disk drive base 102. In the embodiment of FIG. 1, the disk drive cover 104 includes a hole 106 therethrough. A breather filter top nipple 110 is shown to protrude into the hole 106 in the disk drive cover 104.

Figure 2A:
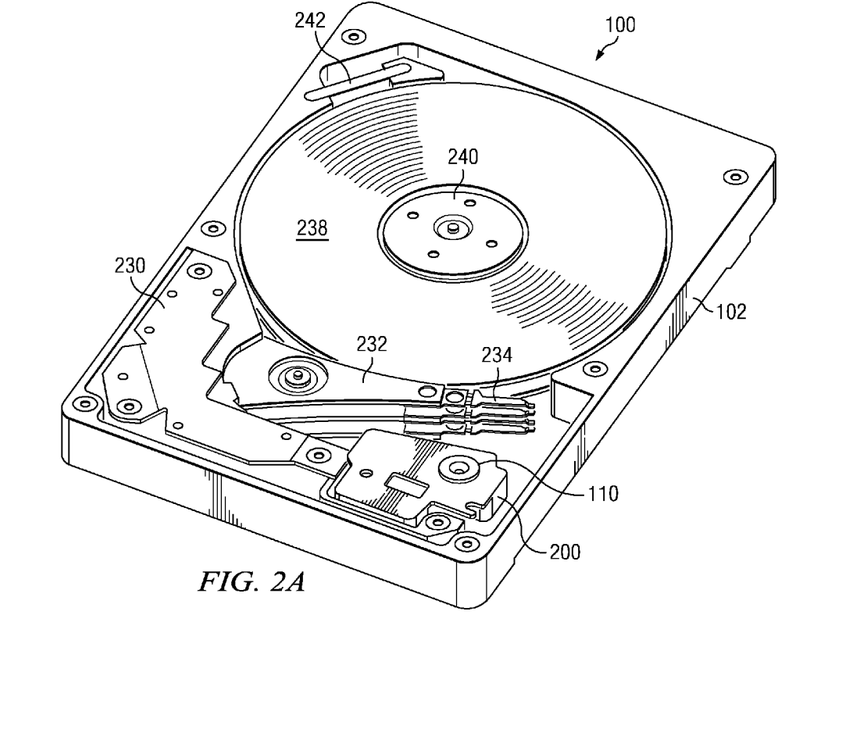
FIG. 2A is a top perspective view of a disk drive according to an embodiment of the present invention, with the disk drive top cover removed to show some internal components.

FIG. 2A is a top perspective view of the disk drive 100 of FIG. 1, except with the disk drive top cover 104 removed to show some internal components. Now referring additionally to FIG. 2A, the disk drive 100 includes a breather filter 200 adjacent the disk drive base 102. The disk drive 100 also includes various other internal components, such as a voice coil motor 230, rotary actuator 232, at least one head suspension 234, at least one disk 238 mounted on a spindle motor 240, and a recirculation filter 242. Not all internal components of disk drive 100 are shown in FIG. 2A, for example a conventional head loading ramp may be positioned adjacent the disk(s) 238 to facilitate merging of the head suspensions 234 onto the disk(s) 238, but is not shown for a more clear view of the breather filter 200.

Figure 2B:
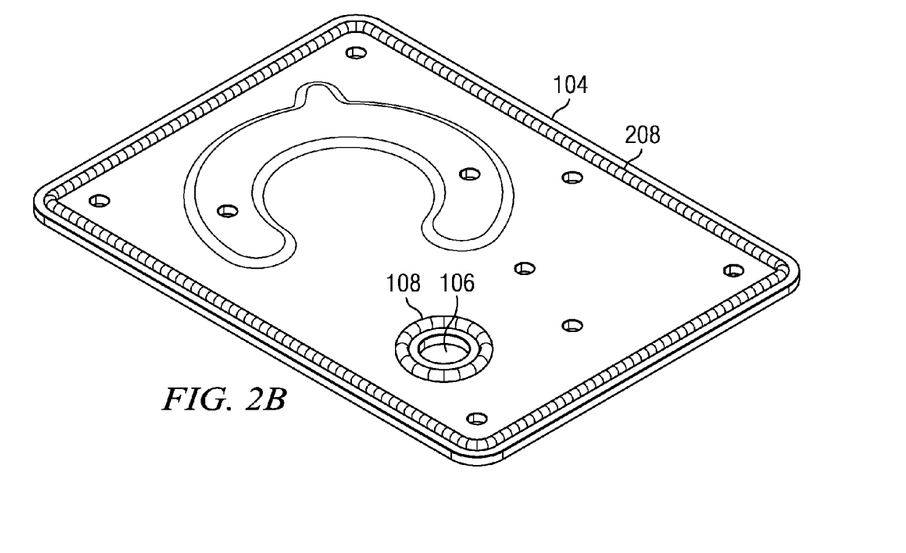
FIG. 2B depicts a formed-in-place gasket adhered to the undersurface of a disk drive cover, according to an embodiment of the present invention.

FIG. 2B depicts the undersurface of the disk drive cover 104, according to an embodiment of the present invention where an annular gasket 108 continuously encircles the hole 106 and is adhered to an undersurface of the disk drive cover 104. Now referring additionally to FIG. 2B, the annular gasket 108 may comprise a conventional gasket material such as an epoxy-based resin elastomer material, a polyacrylate material, ethylene propylene diene monomer rubber (or another rubber like nitrile or buna rubber), neoprene, flexible graphite, a plastic polymer such as polytetrafluoroethylene, ethylene propylene, or urethane. For example, the annular gasket 108 may be disposed on the disk drive cover 104 as a first elongated gel bead that turns to connect with itself, and then is allowed to solidify in place so as to adhere to the disk drive cover 104 but not adhere to the breather filter housing 220 (which contacts the annular gasket 108 only after it solidifies and the disk drive 100 is assembled). Such gaskets will be referred to as "formed-in-place" gaskets herein. In this context, being "allowed to solidify" includes solidification by ultraviolet light curing, elevated temperature oven curing, or other conventional techniques.

Formed-in-place gaskets have unique structural characteristics that are different from pre-formed gaskets. For example, a person of ordinary skill can structurally distinguish a formed-in-place gasket from a pre-formed gasket, based on a tell-tale cross sectional shape that indicates that the gasket material was applied as a gel bead and then solidified in place (e.g. having a top rounded by surface tension with a bottom that has been at least partially flattened by wetting the surface of the disk drive cover).

Accordingly, the phrase "formed-in-place," as used herein, is an adjective describing a structural characteristic of the gasket, rather than being used only as a process limitation. That is, a "formed-in-place gasket" is a resulting structure that a person of ordinary skill would be able to distinguish from other types of gaskets based on structure alone, without previous knowledge of the manufacturing process. The fact that a formed-in-place gasket structure is not obtained by other fabrication methods does not remove the structural significance of "formed-in-place"; rather it just adds additional process significance.

In the embodiment of FIG. 2B, the disk drive cover 104 further includes a peripheral gasket 208 that is adhered to the undersurface of the disk drive cover 104 around its outer periphery. As shown in FIG. 2B, the peripheral gasket 208 may be understood to encircle the annular gasket 108, since it is disposed further from the hole 106 than the annular gasket 108. The peripheral gasket 208 may be a formed-in-place gasket. The formed-in-place peripheral gasket 208 is not adhered to the disk drive base 102, but after assembly of the disk drive 100 it is in compressive contact with the disk drive base 102 to seal a periphery of the disk drive cover 104 with the disk drive base 102. In this way, attaching the disk drive cover 104 to the disk drive base 102 further seals a periphery of the disk drive cover 104 with the disk drive base 102. The peripheral gasket 208 may optionally comprise a gasket material that is the same as that of the annular gasket 108, for example to simplify the material qualification and disk drive fabrication processes.

In the embodiment of FIGS. 1, 2A, and 2B, since the annular gasket 108 and the peripheral gasket 208 are not adhered to the breather filter housing 220 or to disk drive base 102, respectively, the disk drive cover 104 may be simply, cleanly, and practically detached from the disk drive base 102 to facilitate rework of the disk drive 100. Likewise, the disk drive cover 104 (or a similar replacement cover) may be practically reattached to the disk drive base 102 multiple times if necessary, with the annular gasket 108 not adhered to but in compressive contact with the breather filter housing 220.

Figure 3:
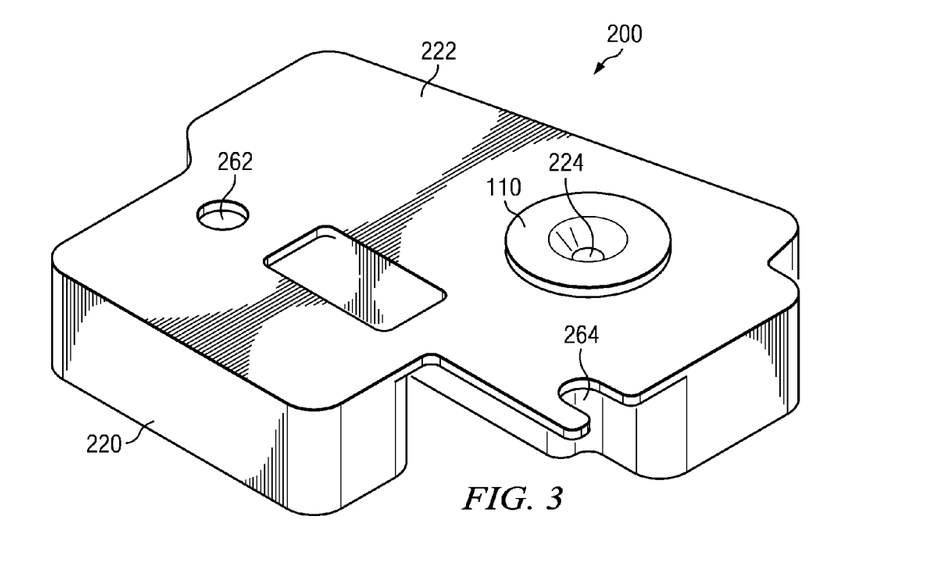
FIG. 3 is a top perspective view of a disk drive breather filter according to an embodiment of the present invention.

Now referring additionally to FIG. 3, the breather filter 200 includes a breather filter housing 220 having a top surface 222. A top nipple 110 protrudes from the top surface 222 of the breather filter housing 220. The top nipple 110 of the breather filter housing 220 includes an entrance port 224. The breather filter 200 of the embodiment of FIG. 3 is designed for simple drop-in/top down assembly into the disk drive enclosure. For example, the breather filter 200 may be located by pins that are fixed to the disk drive base 102, and that protrude through tooling hole 262 and clocking slot 264, and the breather filter 200 may be held down over such pins after disk drive assembly by compressive contact with the annular gasket 108 of the disk drive top cover 104.

Specifically, during disk drive assembly, the breather filter 200 may be placed adjacent the disk drive base 102 with pins fixed to the disk drive base 102 locating the breather filter 200. Then the disk drive cover 104 may be attached to the disk drive base 102, with the annular gasket 108 in compressive contact with the top surface 222 of the breather filter housing 220, and with the annular gasket 108 encircling the entrance port 224 of the top nipple 110. Accordingly, after assembly of the disk drive 100, the annular gasket 108 of the embodiment of FIGS. 1-3 is in compressive contact with, but not adhered to, the top surface 222 of the breather filter housing 220.

Preferably but not necessarily, the annular gasket 108 may define a gasket thickness in the range 0.5 mm to 3 mm, and may define an annular gasket radius about the hole 106 in the range 2 mm to 10 mm. In this context, "thickness" is measured normal to the major plane of the disk drive cover 104. Also for example, if the gasket is a formed-in-place gasket comprising a material that does not substantially shrink during solidification, it may be fabricated from an elongated gel bead that has a thickness in the range 0.5 mm to 3 mm. In certain disk drive embodiments, such dimensional ranges may provide a desired amount of gasket compression between the top surface 222 of the breather filter housing 220 and the undersurface of the top cover 104, for convenient securing of the breather filter 200 in its position, and/or for reliable sealing.

Figure 4:
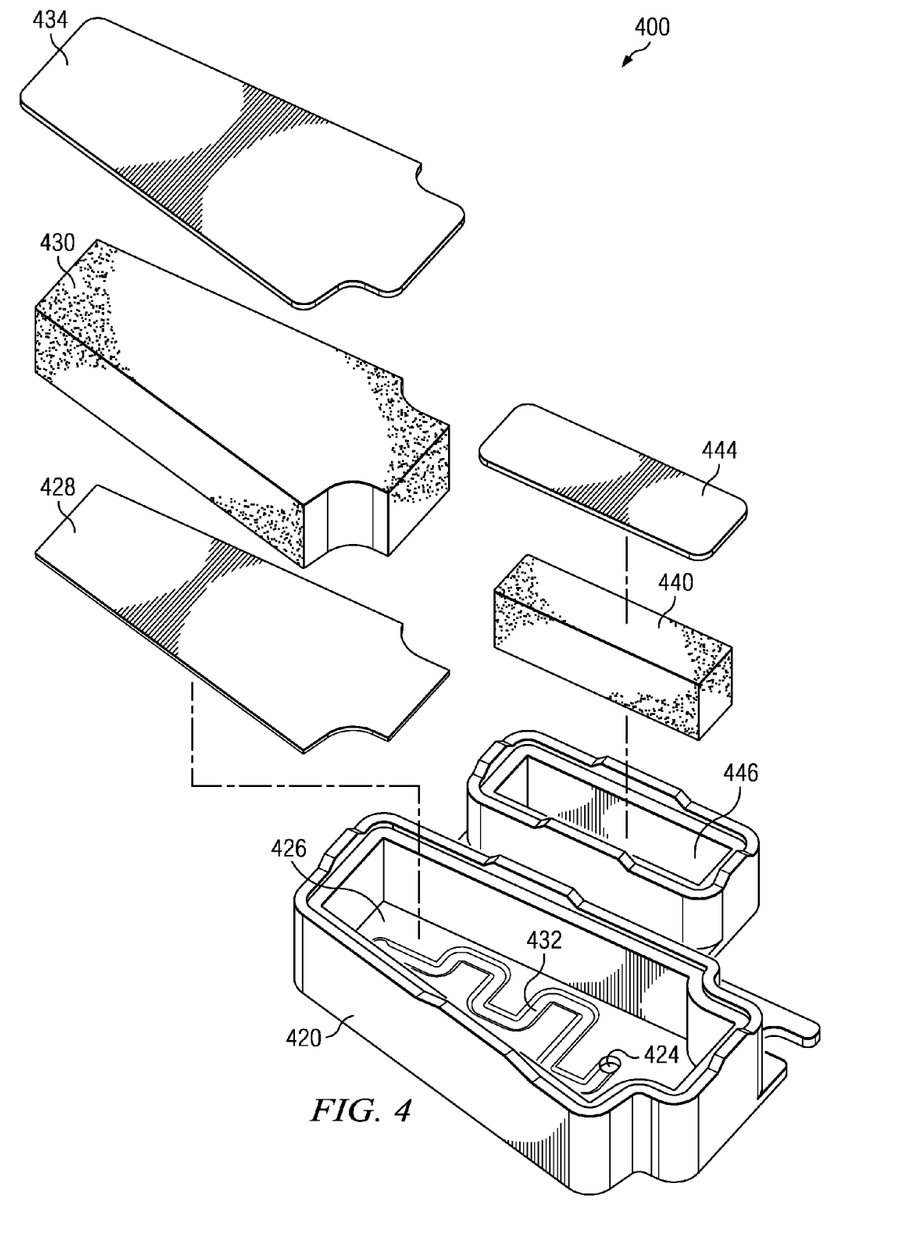
FIG. 4 is an exploded top perspective view of a disk drive breather filter according to an embodiment of the present invention.

FIG. 4 is an exploded top perspective view of a disk drive breather filter 400 according to an embodiment of the present invention. The breather filter 400 includes a breather filter housing 420. The breather filter housing 420 includes a labyrinth path 432 that extends from an entrance port 424 to a primary internal cavity 426. A labyrinth seal layer 428 adheres to the breather filter housing 420 inside the primary internal cavity 426 to seal the labyrinth path 432 over the entrance port 424 and along the labyrinth path 432 (except for a distal end of the labyrinth path 432 that remains open to the primary internal cavity 426). In this way, the labyrinth seal layer 428 effectively lengthens the gas diffusion path from the primary internal cavity 426 through the entrance port 424 to the outside of the breather filter housing 420, to include almost the entire labyrinth path length. The labyrinth seal layer 428 may comprise an impermeable polymer material, for example. The length of the labyrinth path 432 may be chosen to slow gas flow or diffusion through the entrance port 424 into/from the primary internal cavity 426, to achieve a desired limited gas flow or limited diffusion rate under expected operating conditions. For example, the labyrinth path may be chosen to be at least 10 times longer than its greatest transverse dimension, to adequately limit the gas diffusion rate in certain embodiments.

In the embodiment of FIG. 4, a primary adsorbant media 430 is disposed in the primary internal cavity 426, with the labyrinth seal layer 428 disposed between the primary adsorbant media 430 and the labyrinth path 432. The primary adsorbant media 430 may comprise an activated carbon material, for example, or various other adsorbant materials such as silica gel, activated alumina, sodium carbonate, calcium carbonate, potassium carbonate, sodium hydroxide, calcium hydroxide, calcium sulfate, and/or a powdered metal. Also in the embodiment of FIG. 4, a filter layer 434 covers the primary adsorbant media 430, and may be adhered to a periphery of the primary internal cavity 426 of the breather filter housing 420. The filter layer 434 may comprise a porous polymer material such as a polytetrafluoroethylene (PTFE) membrane, for example.

The breather filter 400 of the embodiment of FIG. 4 also optionally includes a secondary cavity 446 in the breather filter housing 420. Unlike the primary internal cavity 426, there is no gas diffusion path through the secondary cavity 446 to the outside of the disk drive enclosure (e.g. via the entrance port 424). A secondary adsorbant media 440 may be disposed within the secondary cavity 446. The secondary adsorbant media 440 may include silica gel, for example, or various other adsorbant materials such as activated carbon, activated alumina, sodium carbonate, calcium carbonate, potassium carbonate, sodium hydroxide, calcium hydroxide, calcium sulfate, and/or a powdered metal. A secondary filter layer 444 may cover the secondary adsorbant media 440, and the secondary filter layer 444 may comprise the same material as the filter layer 434.

Figure 5:
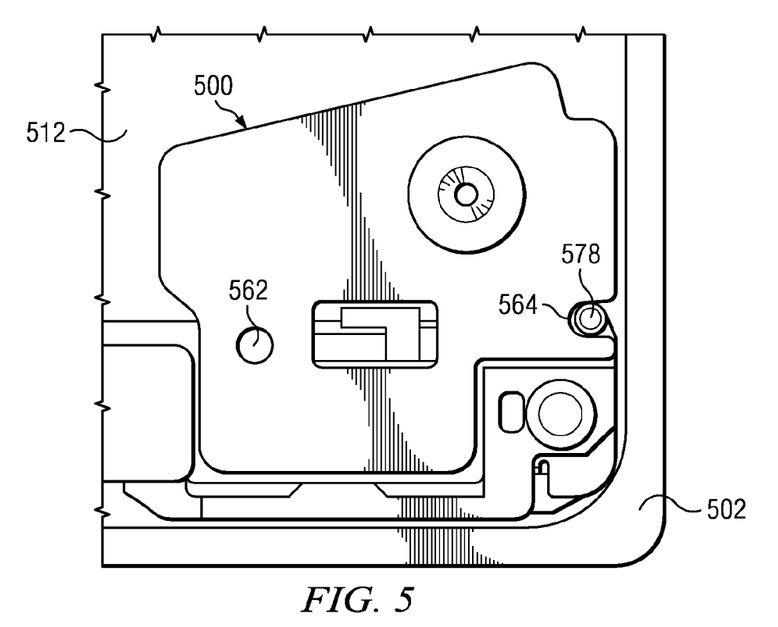
FIG. 5 is a top view of a disk drive breather filter according to another embodiment of the present invention, positioned within a disk drive enclosure.
Figure 6:
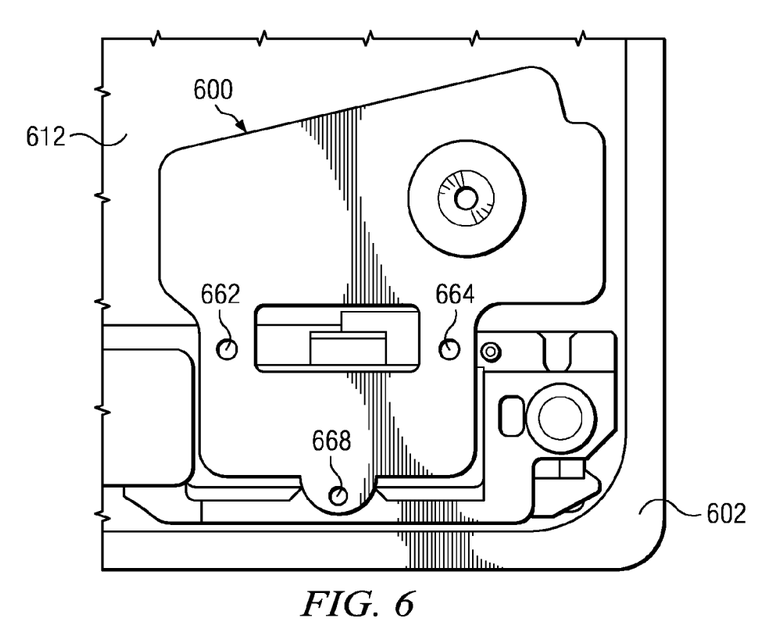
FIG. 6 is a top view of a disk drive breather filter according to another embodiment of the present invention, positioned within a disk drive enclosure.

FIG. 5 is a top view of a disk drive breather filter 500 according to another embodiment of the present invention, positioned within a disk drive enclosure 512. FIG. 6 is a top view of a disk drive breather filter 600 according to another embodiment of the present invention, positioned within a disk drive enclosure 612. Now referring to FIGS. 5 and 6, the breather filters 500, 600 are designed for simple drop-in/top down assembly into the disk drive enclosures 512, 612, respectively. Specifically, the breather filter 500 may be located by pins that are fixed to the disk drive base 502, and that protrude through tooling hole 562 and clocking slot 564. For example, pin 578 is shown in FIG. 5 to protrude through clocking slot 564. Likewise, the breather filter 600 may be located by pins that are fixed to the disk drive base 602, and that protrude through tooling holes 662, 664, and/or 668. The breather filters 500, 600 each may be held down over such locating pins after disk drive assembly by compressive contact with a gasket adhered to the disk drive top cover (e.g. annular gasket 108 of FIG. 2B).

Figure 7:
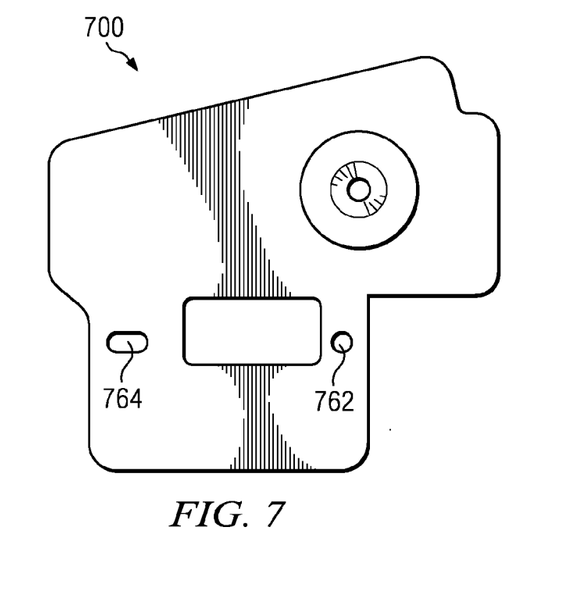
FIG. 7 is a top view of a disk drive breather filter according to another embodiment of the present invention.
Figure 8:
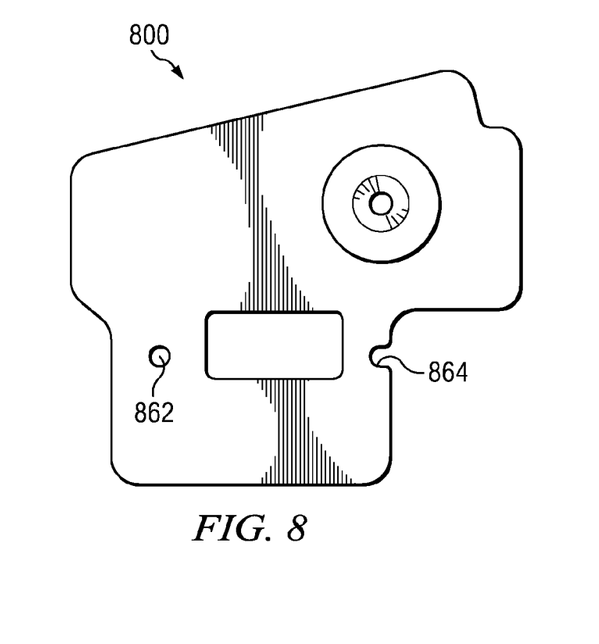
FIG. 8 is a top view of a disk drive breather filter according to another embodiment of the present invention.

FIGS. 7 and 8 depict top views of disk drive breather filters 700, 800 according to additional embodiments of the present invention, respectively. Now referring to FIGS. 7 and 8, the breather filters 700, 800 are designed for simple drop-in/top down assembly into a disk drive. Specifically, the breather filter 700 may be located by pins that are fixed to the disk drive base, and that protrude through tooling hole 762 and clocking slot 764. Likewise, the breather filter 800 may be located by pins that are fixed to the disk drive base, and that protrude through tooling hole 862 and clocking slot 864. The breather filters 700, 800 each may be held down over such locating pins after disk drive assembly by compressive contact with a gasket adhered to the disk drive top cover (e.g. annular gasket 108 of FIG. 2B).

Figure 9A:
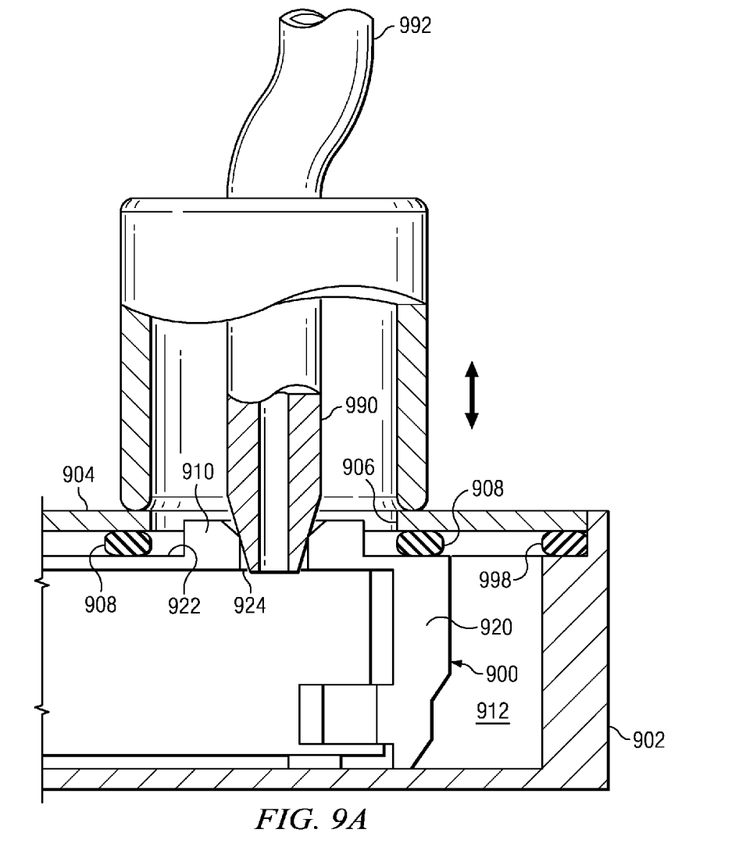
FIG. 9A is a side cross-sectional view of a disk drive breather filter according to an embodiment of the present invention, positioned within a disk drive enclosure, and coupled to a distal end of a gas tube during leak testing.

FIG. 9A is a side cross-sectional view of a disk drive breather filter 900 according to an embodiment of the present invention, positioned within a disk drive enclosure 912, and coupled to a distal end 990 of an external gas tube 992 during leak testing. During leak testing, gas (e.g. air) is forced through the entrance port 924 of the breather filter housing 920, passing through the hole 906 in the disk drive cover 904, to temporarily change an internal pressure within the disk drive enclosure 912 formed by the disk drive cover 904 and the disk drive base 902.

In the embodiment of FIG. 9A, the top nipple 910 of the breather filter housing 920 is shown to optionally include a central cone-shaped depression about the entrance port 924, which may facilitate temporary mating of the distal end 990 of the external gas tube 992 to the entrance port 924. An annular gasket 908 is adhered to the top cover 904 and is in compressive contact with (but not adhered to) the top surface 922 of the breather filter housing 920, to seal the top surface 922 of the breather filter housing to the top cover 904. Likewise, a peripheral gasket 998 is adhered to the top cover 904 and is in compressive contact with (but not adhered to) the disk drive base 902, to seal the top cover 904 to the disk drive base 902.

In this way, gas (e.g. air) may be forced via the external tube 992 and the entrance port 924 to change the pressure in the disk drive enclosure 912. Measurement of the changed internal pressure for a period may serve to detect leaks in the disk drive enclosure 912, and thereby may enable practical and simultaneous leak testing of all potential leak paths from the disk drive enclosure, including any via the gaskets 908 and 998.

Figure 9B:
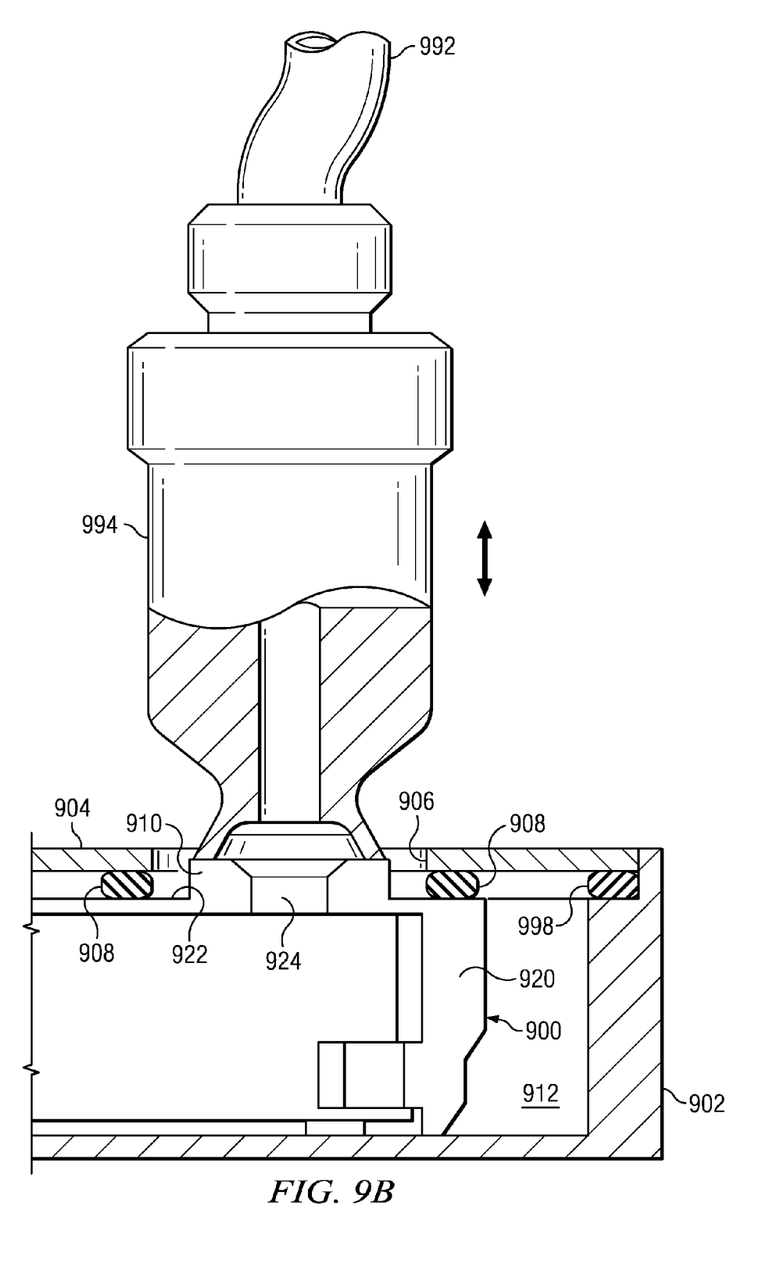
FIG. 9B is a side cross-sectional view of a disk drive breather filter according to an embodiment of the present invention, positioned within a disk drive enclosure, and coupled to a different distal end of a gas tube during leak testing.

FIG. 9B is a side cross-sectional view of a disk drive breather filter 900 according to an embodiment of the present invention, positioned within a disk drive enclosure 912, and coupled to a distal end 994 of an external gas tube 992 during leak testing. In the embodiment of FIG. 9B, the top nipple 910 of the breather filter housing 920 is also shown to optionally include a central cone-shaped depression about the entrance port 924, but this cone-shaped depression is unnecessary and not used to temporary mating of the distal end 994 of the gas tube 992 to the entrance port 924. Rather, the distal end 994 includes a suction cup end that seals to the top nipple 910 as shown, to temporarily mate the external gas tube 992 to the entrance port 924.

In the foregoing specification, the invention is described via specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

I claim:

1. A method to assemble a disk drive, the method comprising:
   providing a disk drive base;
   providing a disk drive cover, the disk drive cover including a hole therethrough and an annular gasket continuously encircling the hole and being adhered to an undersurface of the disk drive cover;
   placing a breather filter adjacent the disk drive base, the breather filter including a breather filter housing having a top surface and an entrance port;
   attaching the disk drive cover to the disk drive base, with the annular gasket in compressive contact with, but not adhered to, the top surface of the breather filter housing, and wherein the annular gasket encircles the entrance port.

2. The method of claim 1 wherein the annular gasket has a gasket thickness in the range 0.5 mm to 3 mm.

3. The method of claim 2 wherein the annular gasket comprises a gasket material selected from the group consisting of an epoxy-based material, a polyacrylate material, a rubber material, a flexible graphite material, and a plastic polymer material.

4. The method of claim 1 wherein the annular gasket is disposed on the disk drive cover as a first elongated gel bead that turns to connect with itself, and then is allowed to solidify in place so as to adhere to the disk drive cover but not adhere to the breather filter housing which contacts the annular gasket after it solidifies.

5. The method of claim 4 wherein the annular gasket comprises a polyacrylate material.

6. The method of claim 4 wherein the first elongated gel bead has a thickness in the range 0.5 mm to 3 mm.

7. The method of claim 4 wherein the disk drive cover includes a peripheral gasket that is disposed on the disk drive cover as a second elongated gel bead that turns to connect with itself, and then is allowed to solidify in place so as to adhere to the disk drive cover but not adhere to the disk drive base which contacts the peripheral gasket after it solidifies.

8. The method of claim 7 wherein the peripheral gasket encircles the annular gasket, and is disposed further from the hole than the annular gasket, and wherein attaching the disk drive cover to the disk drive base further includes sealing a periphery of the disk drive cover with the disk drive base by compression of the peripheral gasket between the disk drive cover and the disk drive base.

9. The method of claim 1 wherein attaching the disk drive cover to the disk drive base further includes sealing a periphery of the disk drive cover with the disk drive base.

10. The method of claim 9 wherein the periphery of the disk drive cover is sealed with the disk drive base by a peripheral gasket that is disposed between the disk drive cover and the disk drive base, and wherein the peripheral gasket comprises a gasket material that is the same as that of the annular gasket.

11. The method of claim 1 further comprising forcing gas through the hole and the entrance port to temporarily change an internal pressure within a disk drive enclosure formed by the disk drive cover and disk drive base.

12. The method of claim 11 wherein the gas is air, and wherein the air is forced through the disk drive enclosure via an external tube that is temporarily mated to the entrance port.

13. The method of claim 11 further comprising measurement of the changed internal pressure for a period to detect leaks in the enclosure.

14. The method of claim 1 further comprising detaching the disk drive cover from the disk drive base to facilitate disk drive rework.

15. The method of claim 14 further comprising reattaching the disk drive cover to the disk drive base, with the annular gasket in compressive contact with the top surface of the breather filter housing and encircling the entrance port.

* * * * *